US006977679B2

(12) United States Patent
Tretter et al.

(10) Patent No.: US 6,977,679 B2
(45) Date of Patent: Dec. 20, 2005

(54) CAMERA META-DATA FOR CONTENT CATEGORIZATION

(75) Inventors: Daniel R. Tretter, Palo Alto, CA (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 897 days.

(21) Appl. No.: 09/825,739

(22) Filed: Apr. 3, 2001

(65) Prior Publication Data

US 2002/0140843 A1 Oct. 3, 2002

(51) Int. Cl.[7] .............................................. H04N 5/76
(52) U.S. Cl. .............................. 348/231.2; 348/231.3; 348/231.5; 382/156; 382/159; 382/227; 703/20
(58) Field of Search ......................... 348/231.6, 231.2, 348/231.99, 231.1, 231.3, 231.5; 707/102, 707/104.1, 101; 382/224, 225, 226, 156, 382/159, 227; 706/20; 703/1

(56) References Cited

U.S. PATENT DOCUMENTS

| 5,274,714 | A | * | 12/1993 | Hutcheson et al. | ......... | 382/157 |
| 5,296,884 | A | | 3/1994 | Honda et al. | | |
| 5,805,215 | A | | 9/1998 | Mizoguchi | | |
| 6,018,728 | A | * | 1/2000 | Spence et al. | ................ | 706/20 |
| 6,606,411 | B1 | * | 8/2003 | Loui et al. | .................. | 382/224 |
| 2001/0046330 | A1 | * | 11/2001 | Shaffer et al. | .............. | 382/284 |

FOREIGN PATENT DOCUMENTS

| EP | 0678816 | 10/1995 |
| WO | WO02099703 | 12/2002 |

OTHER PUBLICATIONS

Japan Electronic Industrydevelopment Association Atandard,Digital Still Camera Image File Format Standard (Exchangeable image file format for Digital Still Camera:Exif) Version 2.1, JEIDA-49-1998, Revised Dec. 1998, p. 35 and "Revision History".*
Vailaya, A., "Content-based Hierarchial Classification of Vacation Images", Jun. 1999, IEEE Multimedia Computing and Systems, vol. 1, pp. 518-523.*
Loui et al: "Automatic Image Event Segmentation and Quality Screening for Albuming Applications" Multimedia and Expo, 2000. IEEE International Conference on New York, NY USA Jul. 30-Aug. 2, 2000, pp. 1125-1128 XP010513207.
Szummer M et al: Indoor-outdoor image classification: Content-based access of images and video database, 1998. Proceedings., 1998 IEEE International Workshop on Bombay, India Jan. 3, 1998. XP010261518.

(Continued)

Primary Examiner—David L. Ometz
Assistant Examiner—Brian Jelinek

(57) ABSTRACT

A method and system for categorizing non-textual subject data, such as digital images, content-based data and meta-data to determine outcomes of classification tasks. The meta-data is indicative of the operational conditions of a recording device during the capturing of the content-based data. For example, the non-textual subject data may be a digital image captured by a digital camera, and the meta-data may include automatic gain setting, film speed, shutter speed, aperture/lens index, focusing distance, date and time, and flash/no flash operation. The subject image is tagged with selected classifiers by subjecting the image to a series of classification tasks utilizing both content-based data and meta data to determine classifiers associated with the subject image.

14 Claims, 5 Drawing Sheets

OTHER PUBLICATIONS

Egmont-Petersen M et al: "Image processing with neural networks- a review" Pattern Recognition, Pergamon Press INC. Elmsford, NY US vol. 35, No. 10, Oct. 2002 pp. 2279-2301 XP 004366785.

Hewagamage K P et al: "Augmented Album: situation-dependent system for a personal digital video/image collection" Multimedia and Expo 2000. IEEE International conference on New York, NY USA Jul. 30-Aug. 2, 2000. Piscataway, NJ USA pp. 323-326 XP010511463.

Moser S et al: "Usage of DSC meta Tags in a general automatic image enhancement systmes" Sensors and Cmaera Systems for Scientific Industrial and Digital Photography applications III, San Jose, CA, USA Jan. 21-23, 2002 vol: 4669 pp. 259-267 XP009014095.

Hewagamage, K. Priyantha et al., "Augmented Album: Situation-dependent System for a Personal Digital Video/Image Collection," HTML Paper No. 0-7803-6536-4, IEEE, 2000.

* cited by examiner

CAMERA META-DATA FOR CONTENT CATEGORIZATION

TECHNICAL FIELD

The invention relates generally to classifying non-textual subject data and more particularly to a method and system for categorizing subject data with classifiers.

BACKGROUND ART

With the proliferation of imaging technology in consumer applications (e.g., digital cameras and Internet-based support), it is becoming more common to store digitized photoalbums and other multimedia contents, such as video and audio files, in personal computers (PCs). There are several popular approaches to categorizing multimedia contents. One approach is to organize the contents (e.g., images) in a chronological order from the earlier events to the most recent events. Another approach is to organize the contents by a topic of interest such as a vacation or a favorite pet. Assuming that the contents to be categorized are relatively few in number, utilizing either of the two approaches is practical, since the volume can easily be managed.

In a less conventional approach, categorization is performed using enabling technology which analyzes the content of the multimedia to be organized. This approach can be useful for businesses and corporations, where the volume of contents, including images to be categorized, can be tremendously large. A typical means for categorizing images utilizing content-analysis technology is to identify the data with classifiers (i.e., semantic descriptions) that describe the attributes of the image. A proper classification allows search software to effectively search for the image by matching a query with the identified classifiers. As an example, a classification for an image of a sunset along a sandy beach of Hawaii may include the classifiers sunset, beach and Hawaii. Following the classification, any one of these descriptions may be input as a query during a search operation.

A substantial amount of research effort has been expended in content-based processing to provide a more accurate automated categorization scheme for digital image, video and audio files. In content-based processing, an algorithm or a set of algorithms is implemented to analyze the content of the subject data for identifying classifier(s) that can be associated with the files. Content similarity, color variance comparison, and contrast analysis may be performed. For color variance analysis, a block-based color histogram correlation method may be performed between consecutive images to determine color similarity of images at the event boundaries. Other types of content-based processing allow a determination of an indoor/outdoor classification, city/landscape classification, sunset/mid-day classification, face detection classification, and the like.

While substantial effort has been focused on content-based processing, alternative or additional approaches have been developed to provide better organization of files of non-textual subject data. A publication entitled "Augmented Album: Situation-dependent System for a Personal Digital Video/image Collection" by Hewagamage and Hirakawa, IEEE, April, 2000, describes a system utilizing non-content-based data (i.e., geographical location, time and corresponding events) to improve the accuracy for categorizing files. Another system incorporates probability principles to existing content-based classification schemes to improve system performance.

Even allowing for the development of enabling technology, the ability to properly categorize files and adequately retrieve the desired files remains questionable. An improper categorization would render the categorization ineffective. This is a concern since files that appear similar, yet distinct, can easily be mis-categorized. As an example, an image having a sunset may mistakenly be categorized as a sunrise. Consequently, the probability of the user being able to retrieve the image in a search is reduced.

What is needed is a file-categorization method and system which provide a high level of reliability with regard to assignments of file classifiers.

SUMMARY OF THE INVENTION

The invention is a method and system for categorizing non-textual subject data on the basis of descriptive classifiers (i.e., semantic descriptions). A recording device captures the non-textual subject data and records meta-data which is specific to the operational conditions of the recording device during the capture. In one embodiment, the non-textual subject data is a digital image file captured by a digital camera, but other files of multimedia contents may be subjected to the categorization. The meta-data may include, but is not limited to, an automatic gain setting, film speed, shutter speed, white balance, aperture/lens index, focusing distance, date and time, and flash/no flash operation. The subject data is categorized on the basis of selected classifiers by subjecting the data to a classification scheme having a series of classification functions. Each classification function utilizes one or both of content-based analysis and meta-data analysis. The classifiers that are selected as the descriptions of a particular image are utilized for matching a query when a search of the image is subsequently conducted for visualization and browsing.

In a preferred embodiment, the subject data is classified in a sequential progression of decision-making within a decision tree that includes utilizing recorded meta-data from the recording device as factors. Within the sequential progression of decision making is a series of decisional node. Each node is a classification function that invokes algorithms for determining whether classifiers should be assigned to particular files (e.g., image files). At each node, a determination of whether to apply a classifier to a specific subject image can be made by content-based analysis, meta-data analysis, or a combination of the two. In content-based analysis, an algorithm that relies on image content information is utilized. In meta-data analysis, the data-capturing attributes recorded by the recording device during the capture of the image are used to aid in the classification functions.

In an alternative embodiment, the subject data is classified by a neural network comprising an input layer of nodes, an output layer of nodes and at least one decision-making layer of nodes sandwiched between the input and output layers. Each node of the input layer is configured to receive a content-based or meta-data component. The results from the input nodes are directed to the decision-making layer. Computations utilizing algorithms (e.g., activation functions) are performed at the decision-making layer as a determination of whether classifiers should be assigned to non-textual subject data. Each node of the decision-making layer utilizes content-based data, meta-data, or a combination of the two for classification. The results are directed to the output nodes.

DETAILED DESCRIPTION

Figure 1:
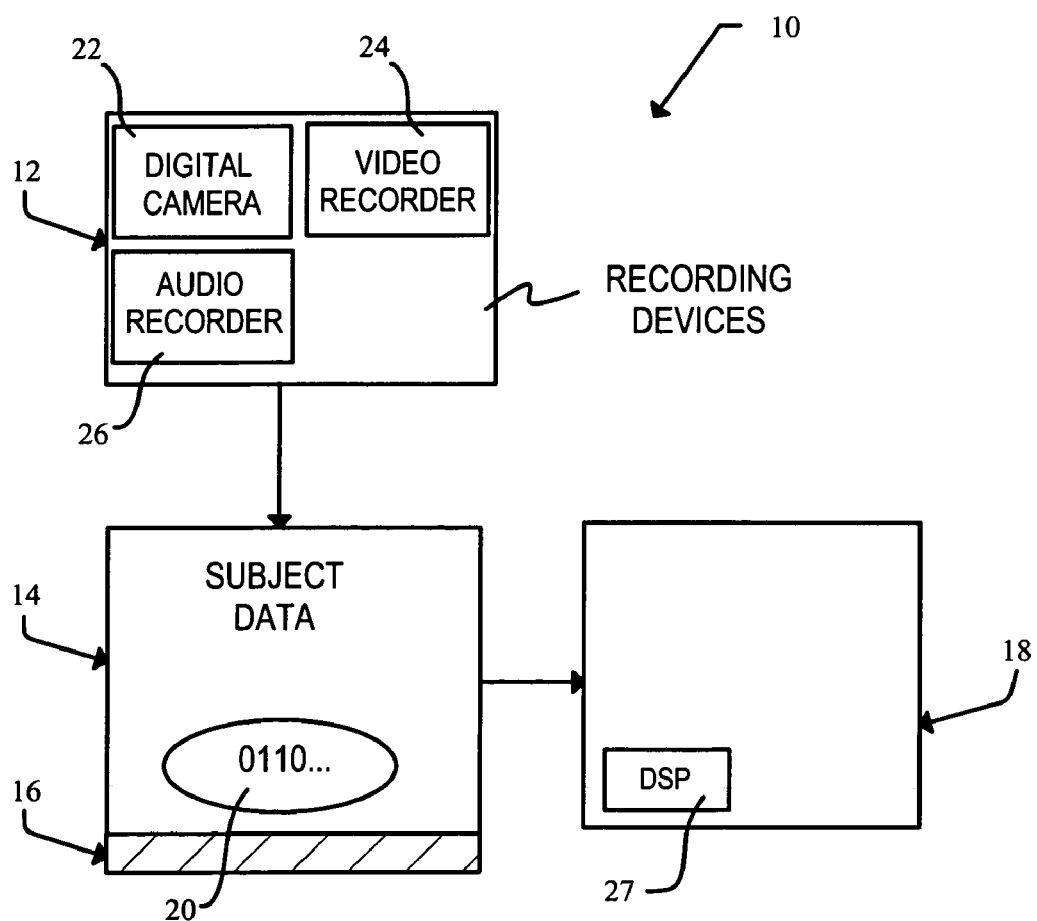
FIG. 1 is a classification system having a recording device for capturing non-textual subject data and meta-data, and a processing system for classifying the subject data in accordance with the invention.

With reference to FIG. 1, a classification system 10 includes at least one recording device 12 for capturing both a file of non-textual subject data 14 and a tagline of associated meta-data 16. The non-textual subject data and the meta-data are transferred to a processing system 18 for identifying and designating classifiers (i.e., semantic descriptions) associated with the non-textual subject data. The non-textual subject data may be a digitized image file 20 that is captured by a digital camera 22. Alternatively, the subject data are video files captured by a video recorder 24 or audio files captured by an audio recorder 26.

The files are segmented into blocks of data for analysis using means (algorithms) known in the art. Along with each file of non-textual subject data 14, meta-data that is specific to the operational conditions of the recording device 12 during the capture of the non-textual subject data is recorded. In the embodiment in which the recording device is the digital camera 22, the meta-data includes, but is not limited to, information related to an automatic gain setting, film speed, shutter speed, white balance, aperture/lens index, focusing distance, date and time, and flash/no flash operation. Classification by the processing system 18 includes applying digital signal processing (DSP) 27 to the non-textual subject data and includes considering the meta-data.

Figure 2:
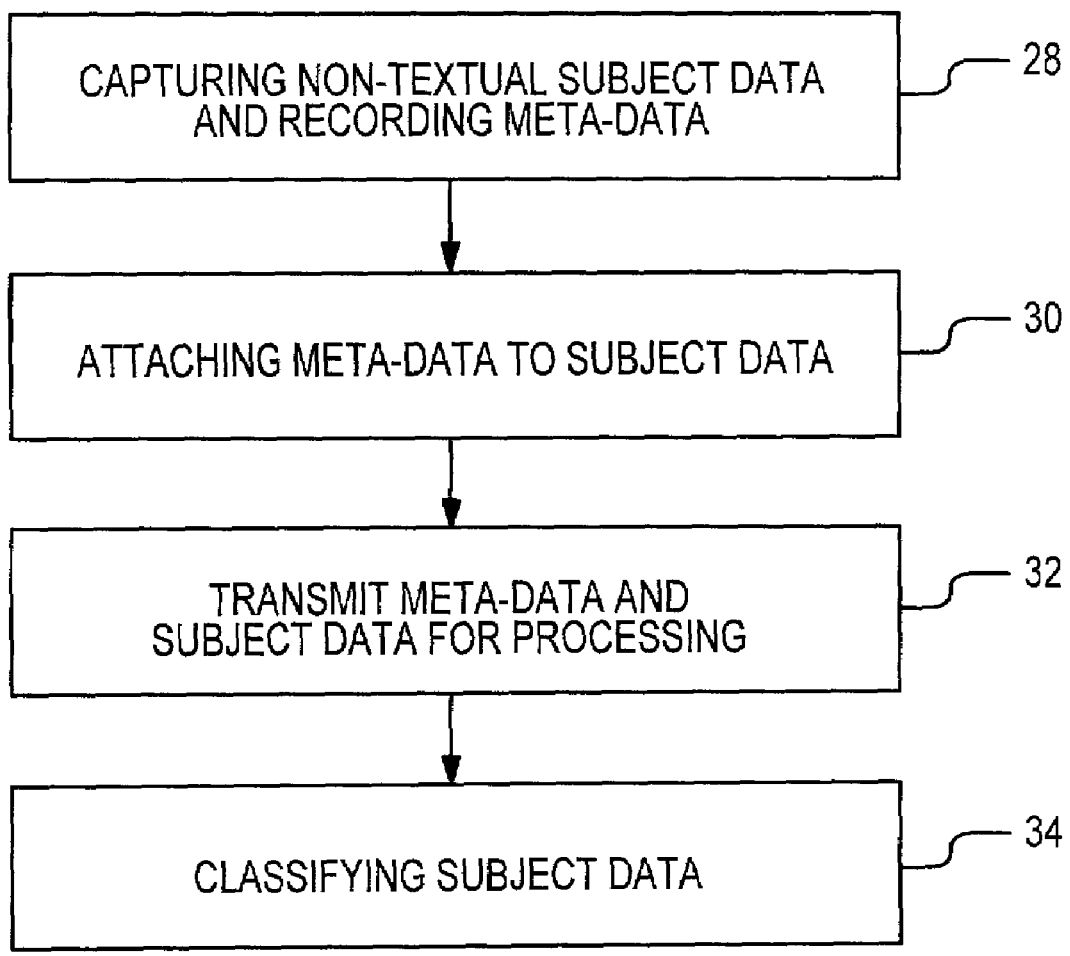
FIG. 2 is a process flow diagram for capturing and transmitting data for subsequent classification in accordance with the classification system of FIG. 1.

Referring to FIG. 2 and with reference to FIG. 1, the process flow of steps for capturing and transmitting data for classifications is sequentially shown. In step 28, the recording device 12 captures the subject image 20 and records the meta-data 16. While this embodiment identifies the captured non-textual subject data as a digitized image, other forms of captured data, including analog-based data from an analog recording device, can be classified. By means known in the art, the analog-based data is digitized prior to processing. Meta-data that is specific to the operational conditions of the analog recording device during the capture of the subject data can be recorded and entered manually by an operator, but is preferably recorded using automated techniques.

In step 30, the meta-data 16 that is specific to the recording device 12 is attached to the subject image 20. As an example, the exposure time and the focusing distance of the digital camera 22 may be tagged onto a captured image of a sunset view. Depending on the particular make and model, each type of digital camera may record a specific set of meta-data unique to that device.

Since a typical camera lacks the necessary processing capabilities for classifying the subject data, the subject image 20 and the meta-data 16 are transmitted to the processing system 18 of FIG. 1 in step 32 for analysis. The processing system is an external unit utilizing algorithms for identifying and assigning classifiers to the subject image. While the processing system is described as an external unit, this is not critical to the invention, since a camera with the necessary internal processing capabilities can be utilized for classifying the subject image.

Figure 3:
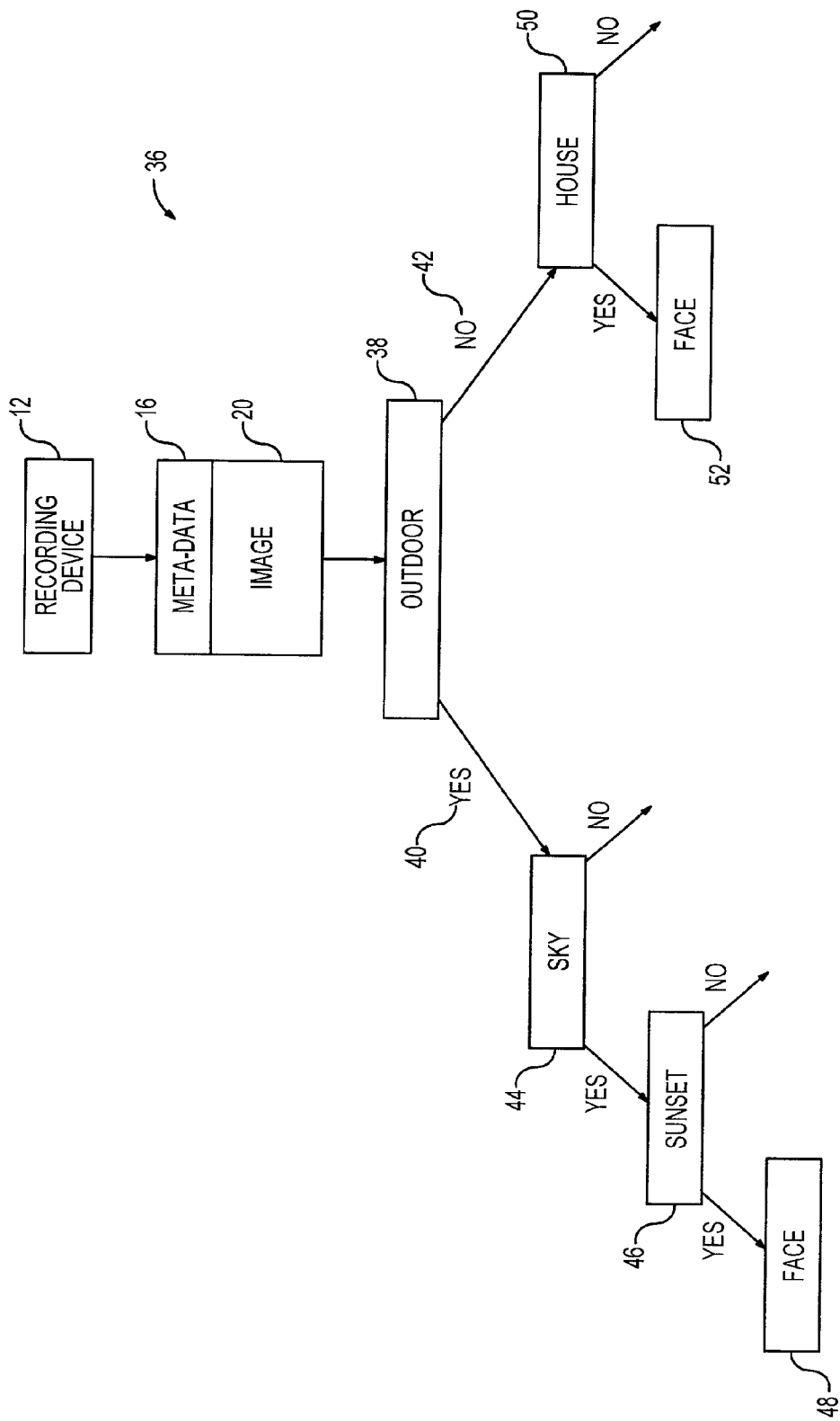
FIG. 3 is a decision tree for identifying classifier(s) associated with the subject data in accordance with the processing system of FIG. 1.

In step 34, the subject image 20 is classified by the processing system 18 at least partially based on the meta-data 16 recorded by the recording device 12. A decision-making classification scheme, such as a decision tree or a neural network, can be utilized for identifying and designating classifiers associated with subject data, such as the subject image. An example of a decision tree 36 is shown in FIG. 3. In the first order, the subject image 20 and the attached meta-data 16 captured by the recording device 12 are subjected to an outdoor classification function 38 to determine if the image is characteristic of an outdoor scene or indoor scene. Each classification function corresponds to a decision node, with each function having two possible outcomes or states of nature (i.e., yes 40 or no 42). Alternatively, each function may have more than two outcomes.

If the outcome of a decision node is a yes, two events follow. First, the image is identified with a particular value. In the case of node 38, the value corresponds to an outdoor classifier. Second, the image is directed to a next classification function which, in this case, is a sky classification function 44. Function 44 determines whether the image should be identified with a sky classifier in addition to the already identified outdoor classifier. If the image is determined by the sky classification function 44 to include a sky, a sunset classification function 46 follows. If the image includes a sunset, a face detection classification function 48 follows. The classification scheme continues until the "bottom" of the decision tree 36 is reached.

An image subjected to analysis may be identified with multiple classifiers. In the decision tree 36, the subject image 20 may be identified with an outdoor classifier, a sky classifier, a sunset classifier, and a face classifier. The number of possible classifiers is dependent on the progressive nature of the classification scheme of the decision tree.

Returning to the outdoor classification function 38, if the outcome is a no 42, the image 20 is identified with either no classifier or an alternative value, such as a default indoor classifier. Regardless, the image progresses to a next classification function which, in this case, is a house classifier function 50 to determine whether the image includes the interior of a house. If the outcome of the house classification function 50 is a yes, the image is identified with a house classifier. Moreover, a face detection classification function 52 follows to detect whether the image also includes a face.

The outcome of each classification function can be determined by content-based analysis, meta-data analysis, or a combination of the two. In content-based analysis, an algorithm that relies on image content information is utilized to determine the outcome of the current classification function. By means known in the art, content-based processing, including, but not limited to, content similarity, color variance and contrast analysis, can be used to obtain determinations of an indoor/outdoor classification function 38, sky/no sky classification function 44, face detection classification function 48 and 52, and the like. As an example for color variance analysis of an image sequence, a block-based color histogram correlation algorithm may be performed between consecutive images to determine color similarity of the images at the event boundaries.

In meta-data analysis, the data-capturing attributes of the recording device 12 are recorded during the capture of the subject image 20. A value assigned to a data-capturing attribute may be accessed and used as a component in executing the current classification function. As previously noted, where the recording device is a digital camera 22 for recording non-textual subject data 14 that is a digital image, the meta-data 16 includes, but is not limited to, automatic gain setting, film speed, shutter speed, white balance, aperture/lens index, focusing distance, date and time, and flash/no flash operation. If the focusing distance is determined to be at infinity during the capturing of the subject image, the probability is high that the image is taken outdoors. On the other hand, the use of a flash indicates that the image was taken indoors and/or after the normal sunlight hours. Moreover, if the exposure time is relatively short during the capturing of the image, the probability is likewise high that the image is taken outdoors. Utilizing meta-data in conjunction with content-based analysis increases the likelihood of accurately determining the appropriate classifiers for the subject image.

Figure 4:
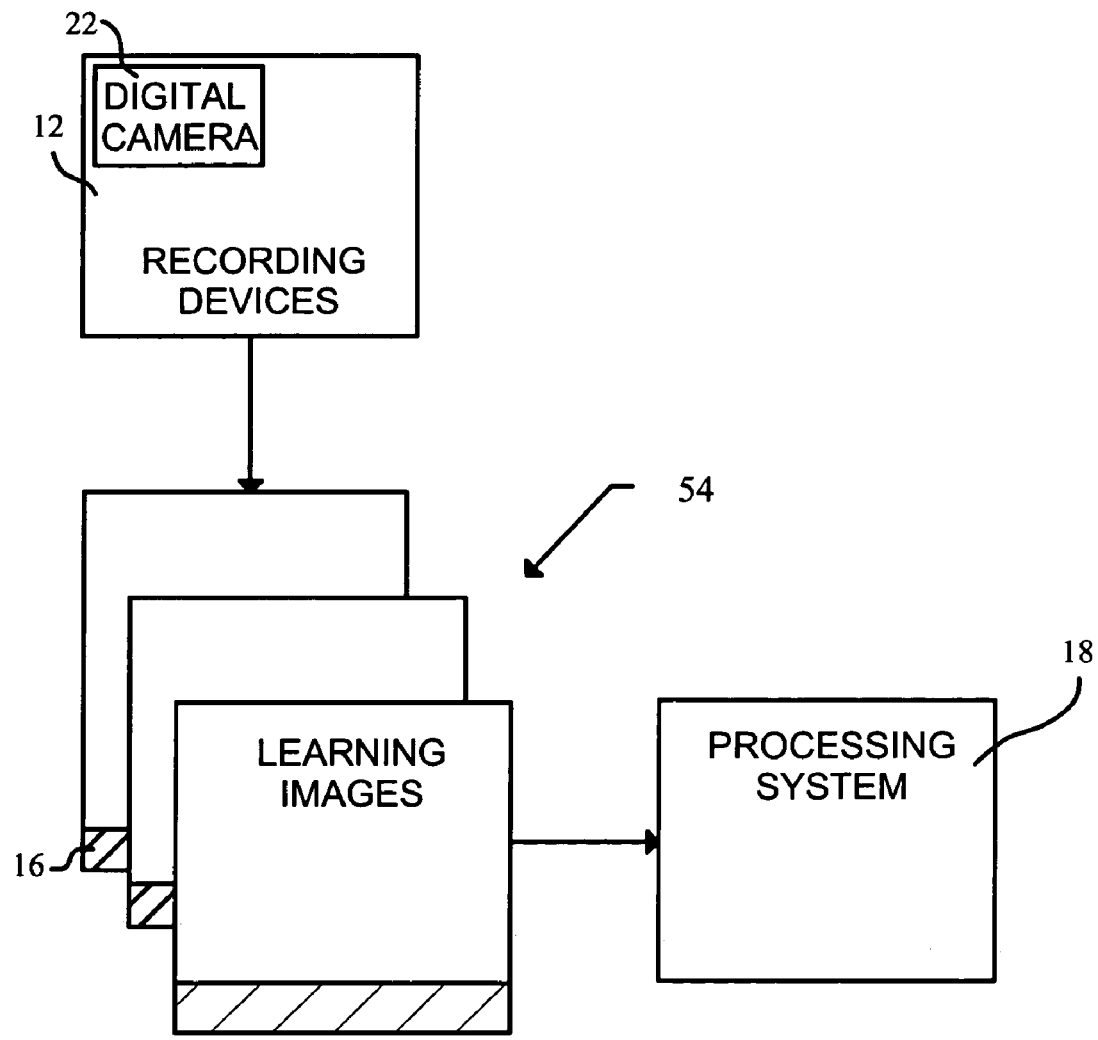
FIG. 4 is the classification system of FIG. 1 for creating a sequential progression of decision making from a set of learning images.

The decision tree 36 of FIG. 3 for determining the sequential progression of decision making for identifying and designating classifier(s) associated with the subject image 20 is initially created from a set of learning images 54, as represented in FIG. 4. During the learning phase, the recording device 12 (e.g., digital camera 22) can be used for capturing the set of learning images 54 and recording the meta-data 16. The images along with the respective meta-data are transmitted to the processing system 18. Each learning image is identified with at least one classifier, depending on the content of the image and/or the meta-data associated with the operational conditions of the capturing device during the capturing of the image. While the set of learning images 54 of FIG. 4 show only a limited number of learning images, there should be a much larger number of learning images for creating the sequential progression of decision making of the decision tree. Moreover, the set should include images with varying contents and meta-data.

The set of learning images 54 is used to order the classification functions into a sequential progression based on at least one of the following three methods: (1) content-based analysis, (2) meta-data analysis, and (3) designation of at least one classifier by an external unit or human operator. The rules regarding the decision tree and the paths leading from one classification function to the next, as well as the type of algorithm used for determining whether a classifier should be identified with the subject image 20 at any given node, can be constructed utilizing association pattern techniques found in data mining.

Figure 5:
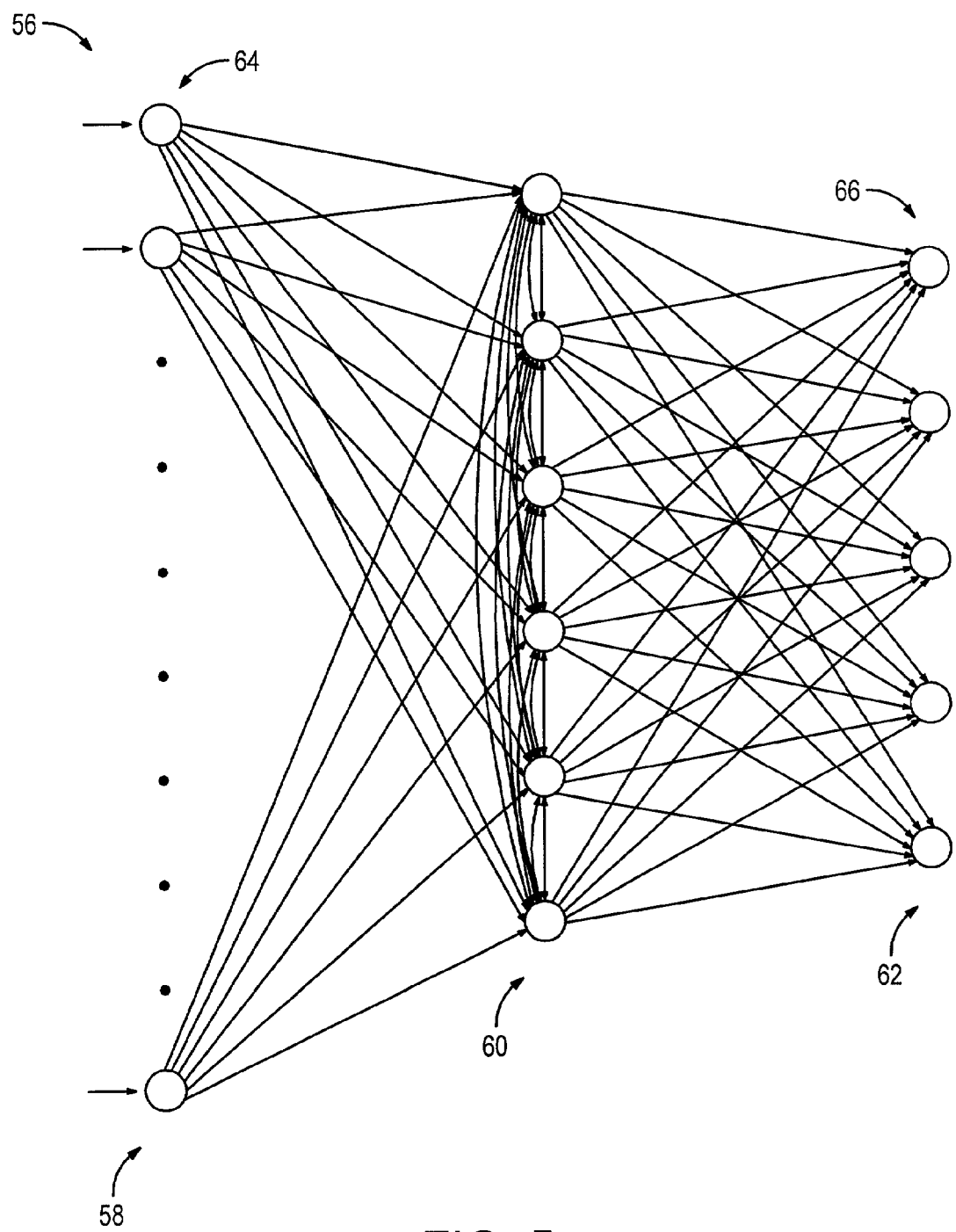
FIG. 5 is a neural network for identifying classifier(s) associated with the subject data in accordance with the processing system of FIG. 1.

In an alternative embodiment, the decision-making classification scheme for classifying the subject image 20 is a neural network 56, as shown in FIG. 5. The neural network comprises an input layer of nodes 58, a "hidden" layer or decision-making layer of nodes 60 and an output layer of nodes 62. Each node of the input layer is configured to receive content-based data or meta-data. For example, node 64 of the input layer may be configured to receive meta-data corresponding to the focusing distance of the recording device 12 during the capture of the subject image 20. No processing is performed by any node in the input layer. Rather, the input nodes are a semantic construct utilized to represent the input layer.

In the decision-making layer 60, there are six-decision making nodes. Each decision-making node may be configured to receive weighted values from the nodes in the preceding layer (i.e., the input layer 58) and from the nodes within the same layer (i.e., decision-making layer 60). Each decision-making node has a connective weight associated with each input and multiples each input value by its associated weight. The node then sums the values for all of the inputs. The sum is then used as an input to an activation function to produce an output for that node. An associated bias term for each function may be utilized for adjusting the output. The activation function is typically a sigmoid function, such as a logistic function or a hyperbolic tangent function. The output from the selected activation function may be directed to a node within the same layer (i.e., decision-making layer) for further processing or to a node in the next layer (i.e., output layer).

The decision-making nodes are configured to generate a decision for identifying and designating a classifier for the subject image 20 at the output layer 62. Each of the nodes in the output layer corresponds to a particular classifier. For example, the image 20 subjected to analysis within the neural network 56 can be categorized as being identified with a sunset classifier at node 66.

Similar to the decision tree 36 of FIG. 3, the neural network of FIG. 5 for identifying and designating classifier(s) associated with the subject image 20 is initially created from a set of learning images. The recording device 12 can be used to capture a set of learning images and record meta-data. The rules regarding the neural network and the associated weights corresponding with each decision-making node, as well as the type of activation function used for determining whether a classifier should be identified with the subject image, are determined from content-based analysis, meta-data analysis, or a combination of the two.

While the invention is shown as comprising six decision-making nodes within the decision-making layer 60, there can be a greater or fewer number of nodes. The optimal number of nodes is dependent on various factors, such as the types of training algorithms utilized and the desired accuracy for the classification scheme. Moreover, there can be a greater number of decision-making layer within the network, again depending on the types of training algorithms and the desired accuracy of the classification scheme. Furthermore, there can be a fewer number or a greater number of classifiers selected for possible identification at the output layer 62, other than the six possible classifiers, as shown in FIG. 5. Finally, other than utilizing the neural network 56 or the decision tree 36 for image categorization, different types of classification schemes, such as applying genetic algorithms, can be used without diverging from the scope of the invention.

What is claimed is:

1. A method for classifying blocks of data comprising the steps of:

capturing a block of non-textual data using a recording device for which settings for data-capture attributes are indicative of characteristics of said non-textual data;

linking meta-data with said block of non-textual data, said meta-data corresponding to at least one said data-capture attribute during said capture by said recording device;

performing automated processing to assign description to contents of said block, including utilizing said meta-data in determining said description by operations within a progression of decisional nodes, said progression of decisional nodes being configured to invoke algorithms for selectively assigning descriptions to said blocks of data; and enabling utilization of said descriptions assigned by said operations within said progression of decisional nodes to implement query searches for particular said blocks of data via query matching.

2. The method of claim 1 wherein said step of capturing includes recording at least one of an image file by an image-capture device and audio file by an audio recorder.

3. The method of claim 1 wherein said step of linking includes obtaining exposure information that identifies an exposure setting of said a recording device.

4. The method of claim 1 wherein said step of capturing further includes configuring said block as a file of non-textual data in a digital format and wherein said step of linking includes forming a tag to said file, said tag being indicative of a plurality of exposure time, automatic gain, film speed, shutter speed, white balance, aperture/lens index, focusing index, and a flash/no flash operation.

5. The method of claim 1 further including a step of transmitting said block of said non-textual data and said meta-data from said recording device to a computer for performing said automated processing.

6. The method of claim 1 wherein said automated processing includes analyzing said non-textual data and said mets-data to identify content-based information and manipulating said content-based information to derive said description.

7. The method of claim 6 wherein said step of analyzing includes applying digital signal processing (DSP) to said non-textual data.

8. A system for classifying subject data comprising:
a recording device for capturing non-textual subject data and for recording mets-data, said meta-data being specific to an operational mode of said recording device during capturing of said non-textual subject data; and
a processor configured to implement a classification technique, said classification technique including a decision tree capable of invoking algorithms that utilize both of said non-textual subject data and said meta-data for identifying at least one classifier, said classifier being representative of an attribute of said subject data, said processor being further configured to implement searches for specific said non-textual subject data via query matching to classifiers identified by said classification technique.

9. The system of claim 8 wherein said recording device is a digital camera.

10. The system of claim 8 wherein said operational mode of said recording device is based on a state as determined by at least one of exposure time, auto gain setting, film speed, shutter speed, white balance, aperture/lens index, focusing distance, and flash/no flash operation.

11. The system of claim 8 wherein said classification technique is a sequential progression of decision making comprising a plurality of classification nodes, at least some of said classification nodes including algorithms for determining which of a plurality of alterative next classification nodes is to be encountered in said sequential progression of decision making.

12. The system of claim 8 wherein said classification technique is a neural network having an input stage, an output stage and at least one decision-making stage, said decision-making stage comprising a plurality of classification nodes, at least some of said classification nodes configured to receive a plurality of weighted inputs from other classification nodes within said decision-making stage and from said input stage for generating an output as a basis for identifying classifiers.

13. A method of categorizing files of non-textual data comprising the steps of:
establishing an evaluation system for decision making, including using automated processing techniques to define a plurality of algorithms, said algorithms utilizing both of content-based data and meta-data, said content-based data corresponding to content information of a file of said non-textual data and said meta-data corresponding to data-capturing settings of a data-capturing device during capture of said file of non-textual data, said establishing including a learning procedure in which said meta-data is identified for each of a plurality of learning images, said meta-data for each said learning image being indicative of operational conditions of said data-capturing device during capture of said learning image;
capturing a file of non-textual subject data;
processing said file of non-textual subject data through said evaluation system for decision making to selectively identify a plurality of classifiers associated with said file of non-textual subject data, said evaluation system including a progression of decisional nodes configured to invoke said algorithms so as to selectively identify said plurality of classifiers; and
enabling utilization of said plurality of classifiers identified by said evaluation system for decision making to implement searches for said file via query matching.

14. The method of claim 13 further comprising a step of generating a plurality of learning classifiers that are descriptive of said learning images, said step of generating including applying content-based analysis for said content-based data and meta-data analysis for said meta-data.

\* \* \* \* \*